(12) United States Patent
Okamoto (10) Patent No.: US 9,351,239 B2
(45) Date of Patent: May 24, 2016

(54) COMMUNICATION DEVICE, NEAR-FIELD COMMUNICATION SYSTEM, AND RECORDING MEDIUM THAT FACILITATE OPERATION AS CONTROL TERMINAL

(71) Applicant: KYOCERA Document Solutions Inc., Osaka (JP)

(72) Inventor: Kentaro Okamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/697,542

(22) Filed: Apr. 27, 2015

(65) Prior Publication Data
US 2015/0319684 A1    Nov. 5, 2015

(30) Foreign Application Priority Data

Apr. 30, 2014  (JP) .................................. 2014-093352
Apr. 30, 2014  (JP) .................................. 2014-093355

(51) Int. Cl.
*H04B 5/00* (2006.01)
*H04W 48/18* (2009.01)
*H04W 4/00* (2009.01)

(52) U.S. Cl.
CPC ............. *H04W 48/18* (2013.01); *H04W 4/008* (2013.01)

(58) Field of Classification Search
CPC .............................. H04W 48/18; H04W 4/008
USPC ............... 455/41.1, 41.2, 11.1, 509, 518, 519
See application file for complete search history.

(56) References Cited

U.S. PATENT DOCUMENTS

| | | | | | |
|---|---|---|---|---|---|
| 6,150,953 | A  * | 11/2000 | Tanaka | ..................... | H04L 29/06 340/3.1 |
| 8,358,596 | B2 * | 1/2013 | Byrne | ................... | H04W 76/02 370/255 |
| 8,880,055 | B1 * | 11/2014 | Clement | ............ | G06Q 20/3278 455/410 |
| 9,042,826 | B2 * | 5/2015 | Confer | ................. | H04B 5/0031 455/41.2 |
| 2010/0046430 | A1 * | 2/2010 | Naito | ...................... | H04L 45/22 370/328 |
| 2013/0266141 | A1 * | 10/2013 | Kim | ...................... | H04W 12/02 380/270 |
| 2013/0316647 | A1 * | 11/2013 | Leica | ................... | H04B 5/0031 455/41.1 |
| 2014/0120832 | A1 * | 5/2014 | Confer | ................. | H04B 5/0031 455/41.1 |
| 2014/0266939 | A1 * | 9/2014 | Baringer | ................ | H01Q 21/28 343/729 |
| 2014/0361968 | A1 * | 12/2014 | Kondo | ..................... | H04N 5/64 345/102 |
| 2015/0015741 | A1 * | 1/2015 | Kim | ................... | H04N 5/23293 348/239 |
| 2015/0121108 | A1 * | 4/2015 | Agrawal | ............... | G06F 1/3206 713/323 |
| 2015/0215565 | A1 * | 7/2015 | Kondo | ................... | H04N 5/445 348/569 |

FOREIGN PATENT DOCUMENTS

JP            2013-223137 A       10/2013

* cited by examiner

*Primary Examiner* — Marceau Milord
(74) *Attorney, Agent, or Firm* — Stein IP, LLC (57) ABSTRACT

A communication device for performing near-field wireless communication with an electronic device includes: a display circuit; a near-field wireless communication circuit that performs the near-field wireless communication; and a control circuit. The control circuit receives information related to a state of the electronic device using the near-field wireless communication when the communication device comes close to the electronic device; and displays the received information related to the state on the display circuit and causes the communication device to transition to a mode corresponding to the information related to the state.

4 Claims, 7 Drawing Sheets

COMMUNICATION DEVICE, NEAR-FIELD COMMUNICATION SYSTEM, AND RECORDING MEDIUM THAT FACILITATE OPERATION AS CONTROL TERMINAL

INCORPORATION BY REFERENCE

This application is based upon, and claims the benefit of priority from, corresponding Japanese Patent Application No. 2014-093352 filed on Apr. 30, 2014 and No. 2014-093355 filed on Apr. 30, 2014 in the Japan Patent Office, the entire contents of which are incorporated herein by reference.

BACKGROUND

Unless otherwise indicated herein, the description in this section is not prior art to the claims in this application and is not admitted to be prior art by inclusion in this section.

In recent years, information is exchanged using a near-field-type wireless communication such as a Near-field wireless communication (NFC) technology.

In a typical image forming apparatus (Multifunction Peripheral (MFP)), when an area for displaying an operation panel is insufficient or a space for arranging an operation button is insufficient in the main body, a typical mobile device such as a smart phone and a tablet type computer owned by a user is used as an extension operation panel. This function is realized as a "remote panel" function.

Also, a typical mobile device, which has a speaker and a microphone, such as a smart phone and a tablet type computer is used as the telephone receiver (handset) of the image forming apparatus with a facsimile function.

Between the typical image forming apparatus and the typical mobile device as a remote panel, near-field wireless communication is used.

Furthermore, a high-speed wireless communication, such as a wireless LAN and Bluetooth (registered trademark), and the near-field wireless communication are used in cooperation with each other. In this cooperation, firstly, the near-field wireless communication, whose communication speed is slow but which can easily start communication, is used to hand over the pairing information required for starting communication using the high-speed wireless communication, whose communication speed is fast. The ordinary communication employs a high-speed wireless communication that achieves a communication speed and has a long communicable distance.

SUMMARY

A communication device for performing near-field wireless communication with an electronic device according to one aspect of the disclosure includes: a display circuit; a near-field wireless communication circuit that performs the near-field wireless communication; and a control circuit. The control circuit receives information related to a state of the electronic device using the near-field wireless communication when the communication device comes close to the electronic device. The control circuit displays the received information related to the state on the display circuit and causes the communication device to transition to a mode corresponding to the information related to the state.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Hereafter, a description will be given of embodiments of the disclosure with reference to the drawings. Here, the disclosure is applicable to a common electronic device that is used in cooperation with the near-field wireless communication and a high-speed wireless communication. In the following description, a description will be given of, for example, an image forming apparatus and a mobile device that functions as a remote panel and a telephone receiver of the image forming apparatus.

Configuration of Image Forming Apparatus

Figure 1:
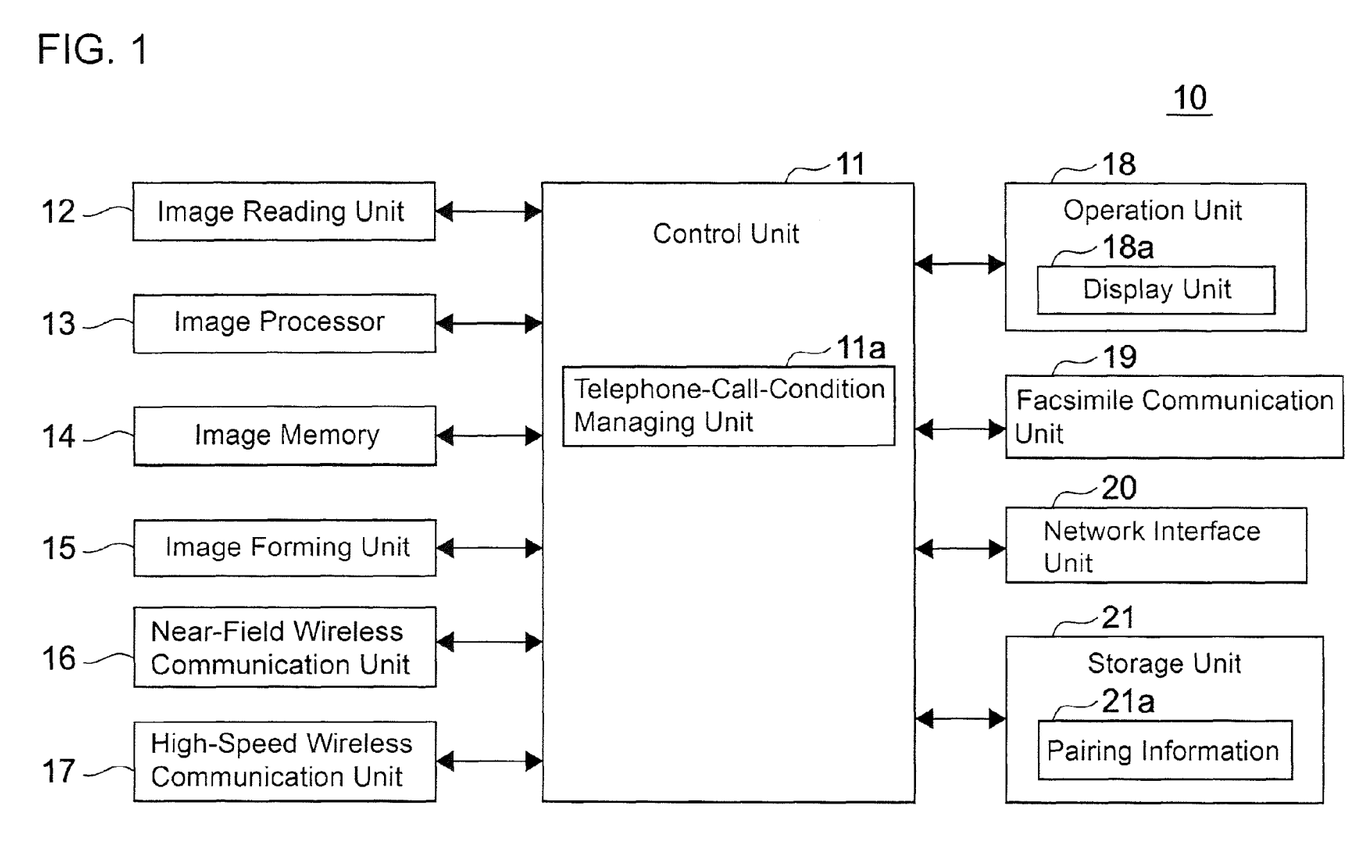
FIG. 1 illustrates a configuration of an image forming apparatus according to one embodiment of the disclosure.

Firstly, a description will be given of the configuration of an image forming apparatus according to one embodiment of the disclosure. FIG. 1 is a block diagram of an image forming apparatus 10 according to one embodiment of the disclosure.

The image forming apparatus 10 (which is also referred to as electronic device) includes a control unit 11. The control unit 11 (which is also referred to as second control unit) is constituted of a Central Processing Unit (CPU), a Random Access Memory (RAM), a Read Only Memory (ROM), a dedicated hardware circuit, and similar member, and manages the entire operation control of the image forming apparatus 10.

The control unit 11 connects to an image reading unit 12, an image processor 13, an image memory 14, an image forming unit 15, a near-field wireless communication unit 16 (which is also referred to as second near-field wireless communication unit), a high-speed wireless communication unit 17, an operation unit 18, a facsimile communication unit 19 (telephone communication unit), a network interface unit 20, a storage unit 21, and similar unit. The control unit 11 performs operation controls of the respective connected units (blocks) described above, and transmits and receives signals or data to/from the respective blocks.

The control unit 11 is a circuit that controls the driving and the process of the mechanism necessary for executing the operation controls of the respective functions such as a scanner function, printing function, a copy function, and a facsimile transmission/reception function, based on a job execution instruction input from a user through the operation unit 18, a network-connected PC, or similar member.

When the user holds the mobile device as a remote panel over (comes close to) the image forming apparatus 10 and then a near-field wireless communication is started, the control unit 11 collects the information related to the state of the image forming apparatus 10 and transmits the collected information to the held mobile device using the near-field wireless communication.

The control unit 11 includes a telephone-call-condition managing unit 11a. The telephone-call-condition managing unit 11a is a circuit that is achieved by execution of the program loaded from the ROM or similar member into the RAM by the CPU. The telephone-call-condition managing unit 11a manages "Waiting," "Calling," "Talking," and "Holding" as the states of the facsimile communication unit 19.

The image reading unit 12 is a circuit such as a scanner that reads an image from a document.

The image processor 13 is a circuit that performs image processing on the image data of the image read by the image reading unit 12 as necessary. For example, to improve the quality after image formation of the image read by the image reading unit 12, the image processor 13 performs image processing such as shading correction.

The image memory 14 is a circuit that has an area that temporarily stores the data of the document image obtained by reading by the image reading unit 12 and temporarily stores the data as a print target in the image forming unit 15.

The image forming unit 15 is a circuit that performs image formation of the image data read by the image reading unit 12 or similar image.

The near-field wireless communication unit 16 is a circuit that performs a near-field wireless communication such as NFC with a communication partner that has come within a certain distance.

The high-speed wireless communication unit 17 is a circuit that performs a high-speed wireless communication that achieves a higher communication speed than that of the near-field wireless communication but requires pairing information to start communication.

Here, the pairing information is setting information for causing a communicable condition between the own device and the partner device. For example, in the case of Wireless Fidelity (Wi-Fi) as a wireless LAN, the pairing information includes Service Set Identifier (SSID), which is unique to the wireless LAN, and the password.

The operation unit 18 is a circuit that includes a touch panel and an operation key, which accept instructions from the user regarding various operations and processes executable by the image forming apparatus 10. The touch panel unit includes a display unit 18a such as a Liquid Crystal Display (LCD) provided with a touch panel.

The facsimile communication unit 19 is a circuit that includes an encoding/decoding unit, a modulation/demodulation unit, and a Network Control Unit (NCU). The facsimile communication unit 19 performs facsimile transmission using a dial-up network. Here, the facsimile communication unit 19 also causes making an ordinary voice call by using the mobile device as a telephone receiver or by preparing an additional handset.

The network interface unit 20 is a circuit constituted of a communication module such as a LAN board. The network interface unit 20 transmits and receives various data to/from a device (an external device such as a server and a PC) within a local area via a LAN connected to the network interface unit 20 or similar network.

The storage unit 21 is a circuit that stores the document image read by the image reading unit 12 or similar image, and stores pairing information 21a required when the high-speed wireless communication unit 17 starts communication. The storage unit 21 is a high-capacity storage device such as a Hard Disk Drive (HDD).

The configuration of the image forming apparatus according to one embodiment of the disclosure has been described above.

Configuration of Mobile Device

Figure 2:
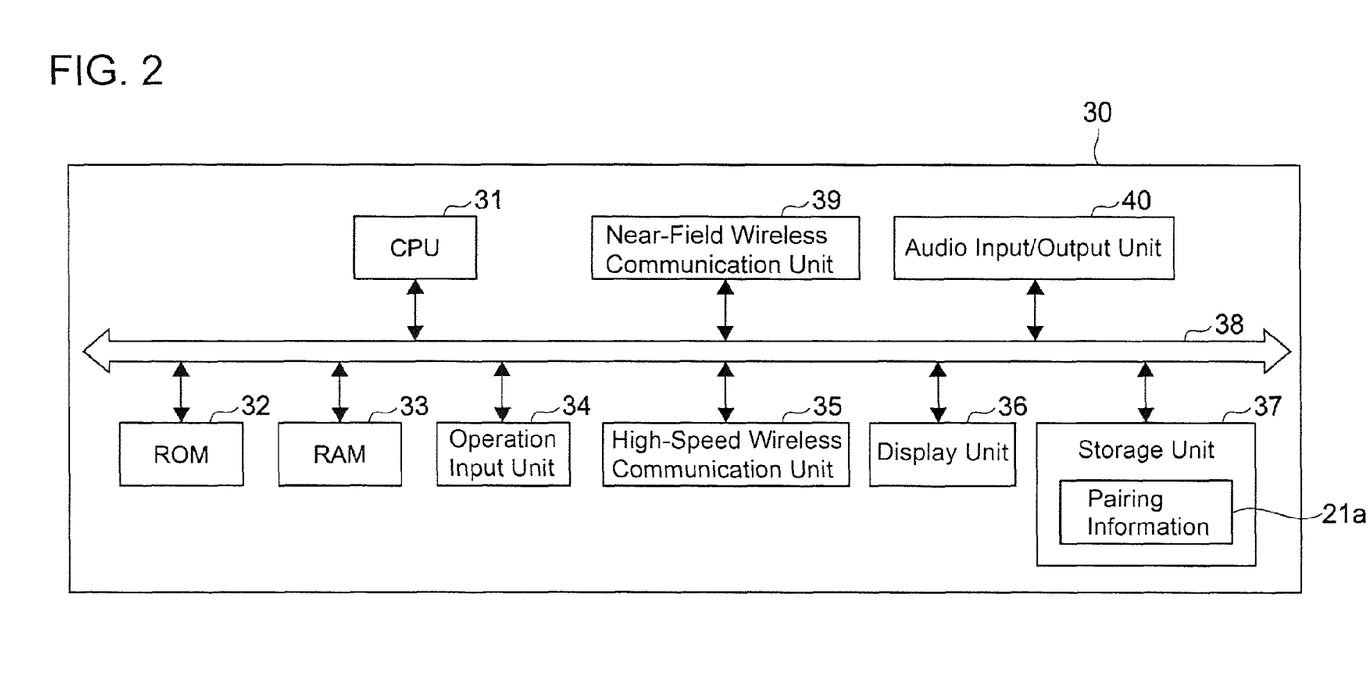
FIG. 2 illustrates a configuration when a common smart phone or a tablet type computer is used as a mobile device according to one embodiment.

The following describes the configuration of the mobile device. FIG. 2 is a block diagram when a common smart phone or tablet type computer is used as the mobile device 30.

As illustrated in FIG. 2, the mobile device 30 (which is also referred to as communication device) includes a CPU 31 (which is also referred to as control unit or first control unit), a ROM 32, a RAM 33, an operation input unit 34, a high-speed wireless communication unit 35, a display unit 36, a storage unit 37, a near-field wireless communication unit 39 (which is also referred to as first near-field wireless communication unit), and an audio input/output unit 40. These respective blocks are connected together via a bus 38.

The ROM 32 fixedly stores a plurality of programs such as firmware and data for executing various processes. The RAM 33 is used as a working area for the CPU 31, and temporarily holds an Operating System (OS), various applications during execution, and various data during processing.

The storage unit 37 is a circuit that is, for example, a Hard Disk Drive (HDD), a flash memory, or another type of non-volatile memory. The storage unit 37 stores the pairing information 21a required when the high-speed wireless communication unit 17 starts communication.

The high-speed wireless communication unit 35 is a circuit that exchanges information with the image forming apparatus 10 and similar member, using the high-speed wireless communication.

The CPU 31 is a circuit that deploys the program corresponding to the instruction provided from the operation input unit 34 among a plurality of programs stored in the ROM 32 and the storage unit 37 in the RAM 33. The CPU 31 controls the display unit 36 and the storage unit 37 as necessary based on this deployed program.

When the user holds the mobile device 30 over the image forming apparatus 10 and the near-field wireless communication unit starts a near-field wireless communication, the CPU 31 acquires the information related to the state of the image forming apparatus 10 from the image forming apparatus 10. The CPU causes the display unit 36 to display the initial screen showing the state of the image forming apparatus 10 based on the acquired information.

The operation input unit 34 is a circuit that is, for example, a pointing device such as a computer mouse, a keyboard, a touch panel, or another type of operating device.

The display unit 36 is a circuit that is, for example, a liquid crystal display an Electro-Luminescence (EL) display, a plasma display, or similar display.

The near-field wireless communication unit 39 is a circuit that performs a near-field wireless communication with the image forming apparatus 10 and similar member. The near-field wireless communication unit 39 starts the near-field wireless communication when the user holds the mobile device 30 over the image forming apparatus 10, and receives the information related to the state of the image forming apparatus 10.

The audio input/output unit 40 is a circuit constituted of a speaker and a microphone. When the facsimile communication unit 19 of the image forming apparatus 10 gets a telephone call for a voice call via a telephone line, the start of the high-speed wireless communication between the image forming apparatus 10 and the mobile device 30 is triggered by holding the mobile device 30 over the image forming apparatus 10. Accordingly, the user can use the audio input/output unit 40 of the mobile device 30 as a telephone receiver (handset) for a telephone call so as to make a voice call via the telephone line and the high-speed wireless communication.

The configuration of the mobile device 30 has been described above.

Procedure of Process that Transmits State of Image Forming Apparatus

Figure 3:
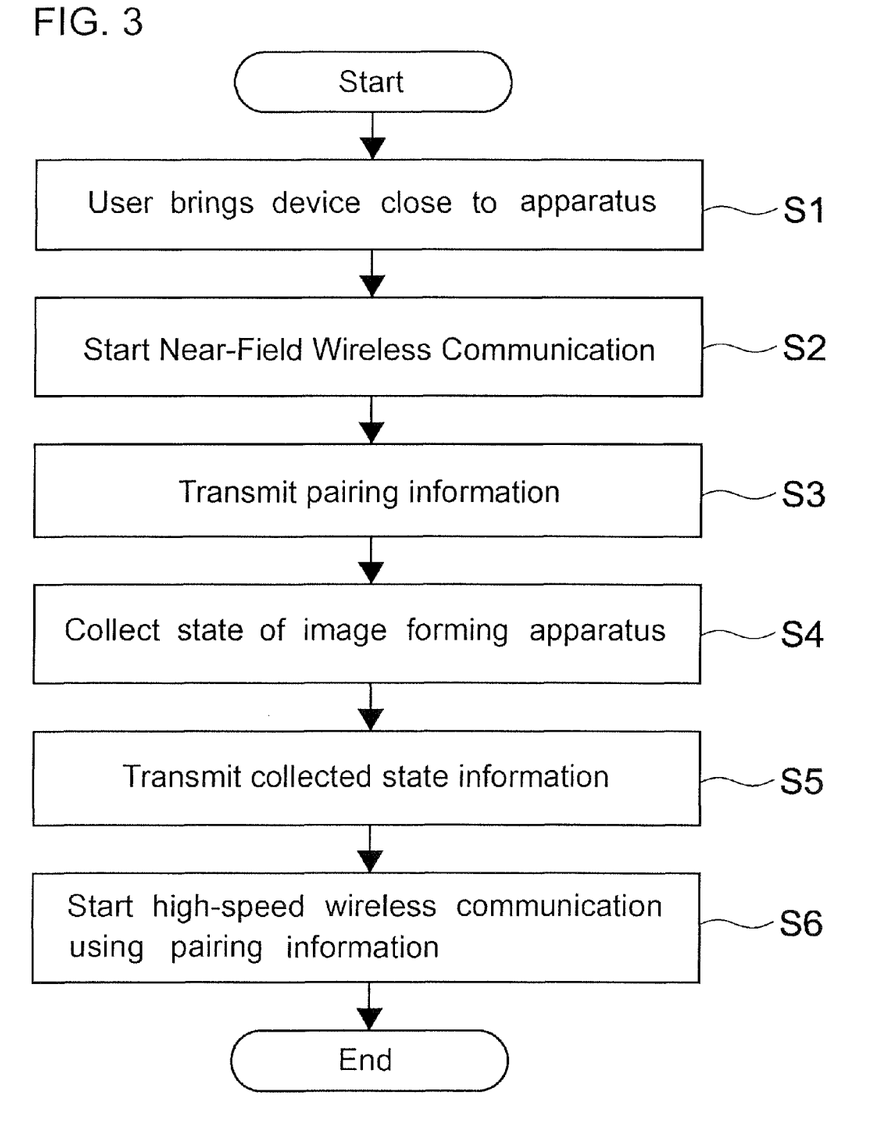
FIG. 3 illustrates an example of a procedure of a process that collects information indicative of a state of the image forming apparatus and transmits this information to the mobile device in the image forming apparatus according to one embodiment.

The following describes an example of the procedure of the process that collects the information indicative of the state of the image forming apparatus 10 and transmits this information to the mobile device 30 in the image forming apparatus 10. FIG. 3 is a flowchart for describing an example of the procedure of the process that collects the information indicative of the state of the image forming apparatus 10 and transmits this information to the mobile device 30 in the image forming apparatus 10.

Firstly, assume that the user holds the mobile device 30 as a remote panel over the image forming apparatus 10 (in step S1).

Subsequently, the near-field wireless communication unit 16 starts a near-field wireless communication (in step S2).

Subsequently, the control unit 11 transmits the pairing information, which is stored in the storage unit 21, for performing a high-speed wireless communication to the mobile device 30 via the near-field wireless communication unit 16 (in step S3).

Subsequently, the control unit 11 collects the information related to the state of the image forming apparatus 10 (in step S4). Here, the information related to the state may be collected and stored in the storage unit 21 in advance.

Subsequently, the control unit 11 transmits the collected information to the mobile device 30 via the near-field wireless communication unit 16 (in step S5).

Subsequently, the control unit 11 uses the transmitted pairing information to start a high-speed wireless communication with the mobile device 30, in response to the request from the mobile device 30 (in step S6).

The above description has been given of the procedure of the process that collects the information indicative of the state of the image forming apparatus 10 and transmits this information to the mobile device 30 in the image forming apparatus 10.

Figure 4:
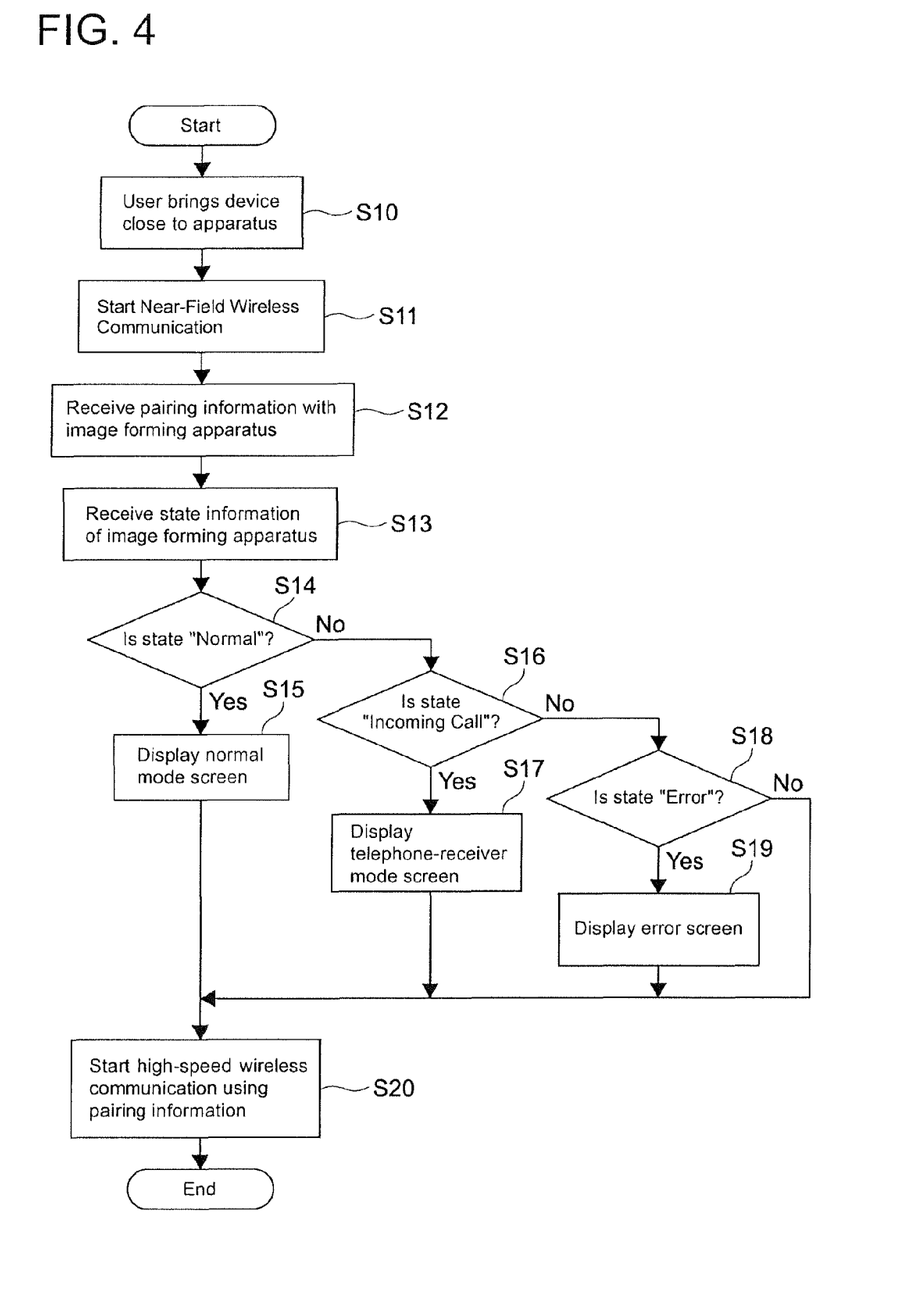
FIG. 4 illustrates an example of a procedure of the process until an initial screen showing the state of the image forming apparatus is displayed in the mobile device according to one embodiment.

Procedure of Process Until Initial Screen Showing State of Image Forming Apparatus is Displayed The following describes an example of the procedure of the process until the initial screen showing the state of the image forming apparatus 10 is displayed in the mobile device 30. FIG. 4 is a flowchart for describing an example of the procedure of the process until the initial screen showing the state of the image forming apparatus 10 is displayed in the mobile device 30.

Firstly, assume that the user holds the mobile device 30 as a remote panel over the image forming apparatus 10 (in step S10).

Subsequently, the near-field wireless communication unit 39 starts a near-field wireless communication (in step S11).

Subsequently, the CPU 31 receives the pairing information for performing a high-speed wireless communication with the image forming apparatus 10 via the near-field wireless communication unit 39 (in step S12).

Subsequently, the CPU 31 receives the information related to the state of the image forming apparatus 10 via the near-field wireless communication unit 39 (in step S13).

Subsequently, the CPU 31 determines whether or not the received information of the state represents "Normal" (in step S14).

When the received information of the state represents "Normal" (Yes in step S14), the CPU 31 displays the screen in a normal mode on the display unit 36 and causes the mobile device 30 to transition to the normal mode (in step S15). Here, in the normal mode, a button and similar component for operating the image forming apparatus 10 is displayed. For example, the operation panel in the state where no event occurs is displayed. At this time, the mobile device 30 functions as a remote panel.

When the received information of the state does not represent "Normal" (No in step S14), subsequently, the CPU 31 determines whether or not the received information of the state represents "Incoming Call" (in step S16).

When the received information of the state represents "Incoming Call" (Yes in step S16), the CPU 31 displays the screen in a telephone-receiver mode on the display unit 36 and causes the mobile device 30 transition to the telephone-receiver mode (in step S17). Here, in the telephone-receiver mode, the mobile device 30 in the telephone-receiver mode functions as a handset having a microphone and a speaker to allow the user to make a telephone call.

When the received information of the state does not represent "Incoming Call" (No in step S16), subsequently, the CPU 31 determines whether or not the received information of the state represents "Error" (in step S18).

When the received information of the state represents "Error" in the image forming apparatus (Yes in step S18), the CPU 31 displays the screen for error information on the display unit 36 (in step S19). Here, the error means, for example, a paper jam, a paper empty state, a toner empty state, or similar error in the image forming apparatus 10.

After displaying the initial screen on the display unit 36, the CPU 31 requests the image forming apparatus 10 to start a high-speed wireless communication so as to start a high-speed wireless communication with the image forming apparatus 10 using the received pairing information (in step S20).

As just described, when the user simply holds the mobile device 30 as a remote panel over the image forming apparatus 10 where some event occurs, the mobile device 30 transitions to the mode corresponding to the occurring event. After a near-field communication, the mobile device 30 displays the screen for each mode as the initial screen, which is firstly output, on the display unit 36.

For example, when the image forming apparatus 10 has an incoming telephone call, the user can hold the mobile device 30 over the image forming apparatus 10 such that the mobile device 30 immediately becomes the telephone-receiver mode. This allows the user to take the telephone call using the mobile device 30 as a handset.

For example, when an error occurs in the image forming apparatus 10, the user can hold the mobile device 30 over the image forming apparatus 10 such that the display unit 36 of the mobile device 30 immediately displays the content of the occurring error so as to allow the user to immediately deal with the error.

This reduces the work load of the user for outputting the screen that displays the required information, compared with the configuration that displays a common initial screen regardless of the event occurring in the image forming apparatus 10. This solves the problem as described below.

Up to the present, for example, when an error such as a paper jam occurs in the image forming apparatus or when the telephone of the image forming apparatus has an incoming call, the mobile device as a remote panel is held over the image forming apparatus to start the use of the remote panel and then the common initial screen for the remote panel is firstly displayed. To display the detailed information related to the state of the image forming apparatus on the remote panel, the user needs to perform an explicit operation on the remote panel. This laborious operation has been a problem.

The above description has been given of the procedure of the process until the initial screen showing the state of the image forming apparatus 10 is displayed in the mobile device 30.

Summary of Method for Handing Over Pairing Information and Similar Method

Figure 5:
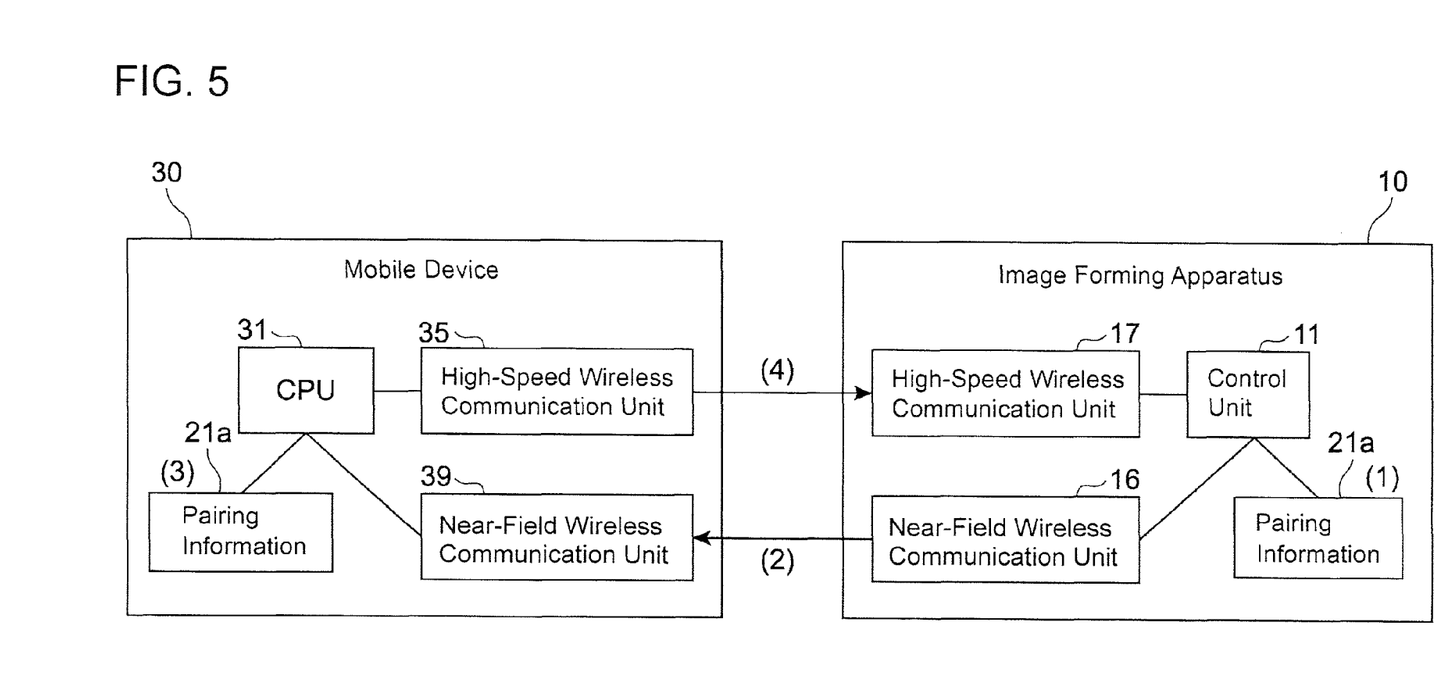
FIG. 5 illustrates an example where pairing information is handed over using near-field wireless communication and the handed pairing information is used to start a high-speed wireless communication, between the image forming apparatus and the mobile device according to one embodiment.

Here, a description will be given of the example where pairing information is handed over using the near-field wireless communication and the handed pairing information is used to start a high-speed wireless communication, between the image forming apparatus 10 and the mobile device 30 as the example using Wi-Fi Direct technology. Here, in the following process, assume that the high-speed wireless communication employs Wi-Fi Direct technology. Wi-Fi Direct can perform a peer-to-peer wireless communication between devices having wireless LAN functions without an access point, and uses an SSID and a password as pairing information.

FIG. 5 is a diagram describing an example where pairing information is handed over using the near-field wireless communication and the handed pairing information is used to start a high-speed wireless communication, between the image forming apparatus 10 and the mobile device 30.

(1) As the initial state, the image forming apparatus 10 keeps the pairing information 21a required for Wi-Fi Direct connection.

(2) Subsequently, when the user holds the mobile device 30 over the image forming apparatus 10, the pairing information is handed over to the mobile device 30 from the image forming apparatus 10 using a near-field wireless communication. The near-field wireless communication itself can perform wireless communication without requiring the pairing information.

(3) The mobile device 30 stores the handed pairing information 21a in the storage unit 37.

(4) The mobile device 30 uses the stored pairing information 21a to start Wi-Fi Direct communication with the image forming apparatus 10.

The above description has been given of the example where pairing information is handed over using the near-field wireless communication and the handed pairing information is used to start a high-speed wireless communication, between the image forming apparatus 10 and the mobile device 30 as the example using Wi-Fi Direct technology.

Outline of Operation for Switching Mobile Device as Telephone Receiver

The above description has been given of the operation where the mobile device 30 is held over the image forming apparatus 10 to variously change the initial screen of the mobile device 30 depending on the state of the image forming apparatus 10.

The following description is premised on the state where the image forming apparatus 10 have an incoming telephone call, the user holds the mobile device 30 over the image forming apparatus 10, and then the mobile device 30 becomes the telephone-receiver mode and functions as a telephone receiver.

Firstly, a description will be given of the outline of the operation for switching the mobile device as a telephone receiver. Here, in the following description, to distinguish between two users and two mobile devices 30, a description will be given using a user A, a user B, a mobile device 30A, and a mobile device 30B. The mobile device 30A and the mobile device 30B differ from each other only by the user A and the user B, but their configurations are similar to that of the mobile device 30.

Here, assume that the mobile device 30A held over the image forming apparatus 10 is in the telephone-receiver mode and the user A is during a telephone call. Then, assume that the speaker needs to be changed from the user A to the user B.

The outline of the process that can be seen from the user at this time is as follows.

(1) The user A holds the mobile device 30A over the mobile device 30B of the user B.

(2) The user A holds the telephone call in the mobile device 30A.

(3) The user B releases the hold in the mobile device 30B to start a telephone call.

The outline of the operation for switching the mobile device as a telephone receiver has been described above.

Switching of High-Speed Wireless Communication

Figure 6:
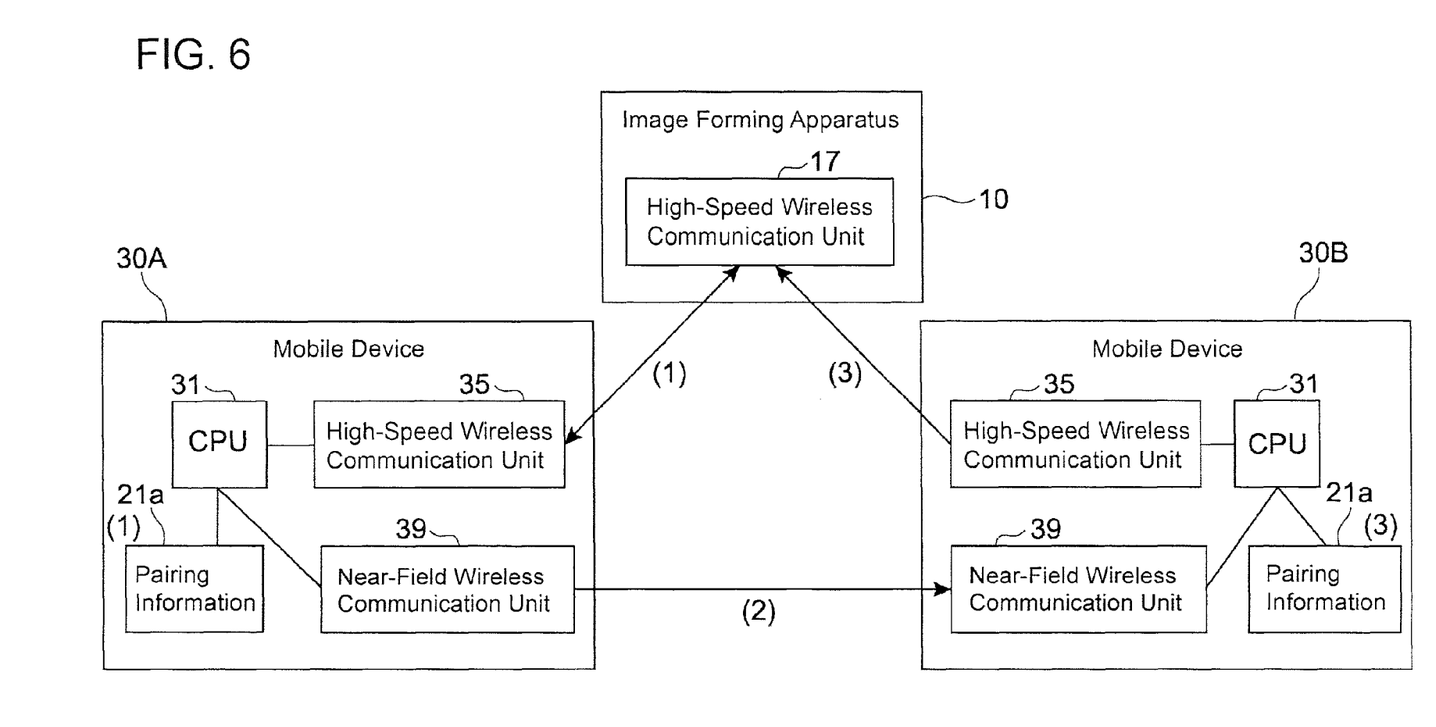
FIG. 6 illustrates a process for switching the high-speed wireless communication as a base for switching the mobile device as a telephone receiver according to one embodiment.

The following describes the process for switching a high-speed wireless communication as a base for switching the mobile device as a telephone receiver during a telephone call as described above. FIG. 6 is a diagram for describing the process for switching a high-speed wireless communication as a base for switching the mobile device as a telephone receiver.

(1) As the initial state, assume that the mobile device 30A can perform a high-speed wireless communication with the image forming apparatus 10. In this state, the pairing information 21a required for performing a high-speed wireless communication is stored in the storage unit 37 of the mobile device 30A.

(2) Subsequently, when the user A holds the mobile device 30A over the mobile device 30B of the user B, the pairing information 21a for performing a high-speed wireless communication with the image forming apparatus 10 is handed over between the mobile device 30A and the mobile device 30B using a near-field wireless communication.

(3) The mobile device 30B stores the handed pairing information 21a in the storage unit 37, and uses the handed pairing information 21a to start a high-speed wireless communication with the image forming apparatus 10.

The above description has been given of the process for switching a high-speed wireless communication as a base for switching the mobile device as a telephone receiver during a telephone call.

Possible States of Image Forming Apparatus Regarding Telephone Call

Here, regarding the telephone call, possible four states to be taken by the image forming apparatus 10 will be described. The image forming apparatus 10 takes any of these four states.

(A) State of "Waiting"

This state is a state that has no telephone call. In this state, the mobile devices 30A and 30B does not become the telephone-receiver mode and cannot perform the operation for taking a telephone call.

(B) State of "Calling"

This state is a state that has an incoming telephone call. In this state, any of the mobile devices 30A and 30B becomes the telephone-receiver mode and can take the incoming telephone call. When any of the mobile devices 30A and 30B takes the telephone call, the state of the image forming apparatus transitions to the following state of "Talking."

(C) State of "Talking"

This state is a state where any of the mobile devices 30A and 30B becomes the telephone-receiver mode and the user is having a telephone call. In this state, the mobile device other than the mobile device having the telephone call cannot become the telephone-receiver mode to make or take a telephone call by exclusive control of the image forming apparatus 10.

(D) State of "Holding"

This state is a state where the user A presses a hold button in the mobile device (here, the mobile device 30A) during a telephone call so as to hold the telephone call between the mobile device 30A and the image forming apparatus 10. In this state, the user B can resume the telephone call on hold using the mobile device 30B set to the telephone-receiver mode.

The possible four states to be taken by the image forming apparatus 10 regarding the telephone call has been described above.

Process for Switching Mobile Device as Telephone Receiver During Telephone Call

Figure 7:
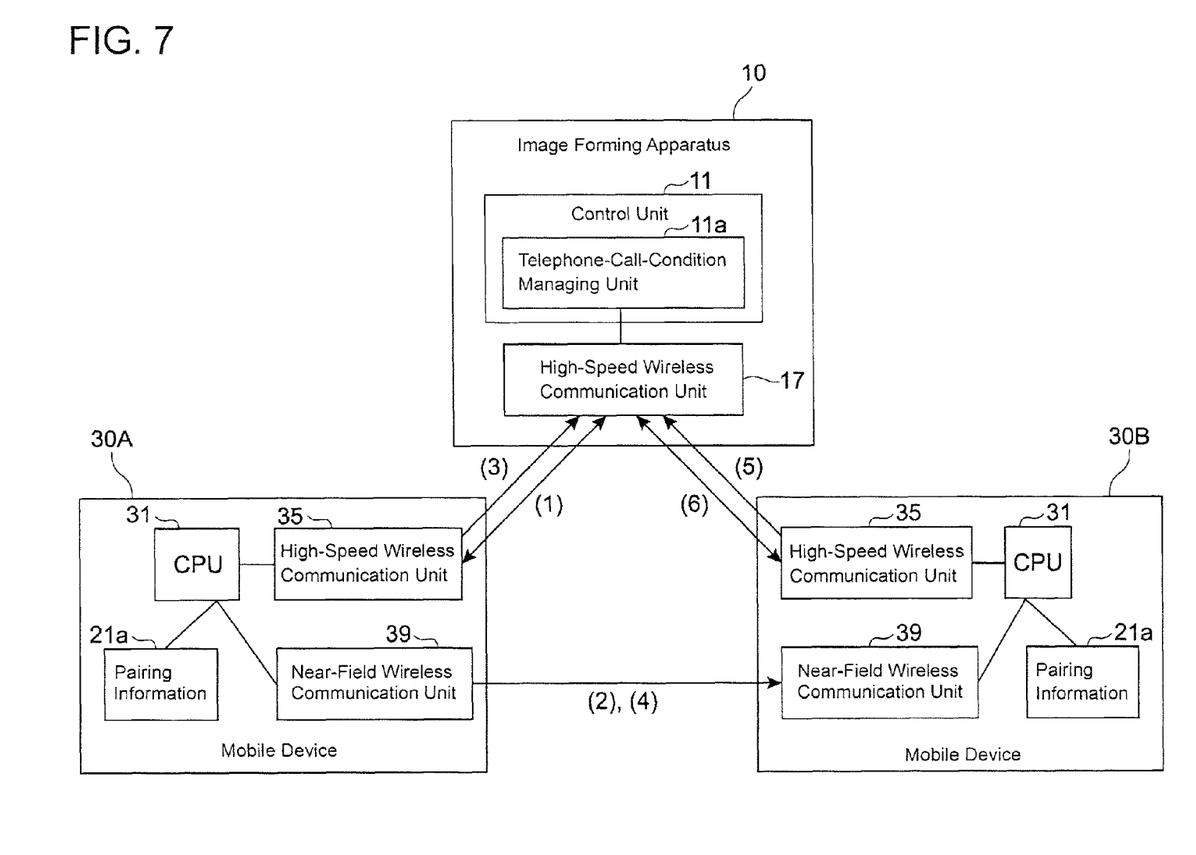
FIG. 7 illustrates a process for switching the mobile device as a telephone receiver during a telephone call using the process for switching the high-speed wireless communication according to one embodiment.

The following describes the process for switching the mobile device as a telephone receiver during a telephone call using the above-described process for switching the high-speed wireless communication. FIG. 7 is a diagram for describing the process for switching the mobile device as a telephone receiver during a telephone call using the process for switching the high-speed wireless communication.

(1) As the initial state, assume that the image forming apparatus 10 has an incoming telephone call, the user A takes this telephone call with the mobile device 30A, and thus the image forming apparatus 10 is in the state of "Talking." The telephone-call-condition managing unit 11a of the image forming apparatus 10 manages the state of the own device as "Talking."

(2) Subsequently, assume that the speaker of the telephone call is changed from the user A to the user B. To switch the mobile device used for the telephone call from the mobile device 30A to the mobile device 30B, the user A holds the mobile device 30A over the mobile device 30B of the user B so as to hand over the pairing information for communication with the image forming apparatus 10.

(3) Subsequently, to release the state of the telephone call between the mobile device 30A and the image forming apparatus 10, for example, the user A presses the hold button to send the intention of holding to the image forming apparatus 10. Thus, the telephone-call-condition managing unit 11a of the image forming apparatus 10 sets the image forming apparatus 10 to the state of "Holding."

(4) Subsequently, the user A holds the mobile device 30A over the mobile device 30B again so as to notify the mobile device 30B about holding the telephone call.

(5) When the mobile device 30B receives the notification about holding the telephone call, the mobile device 30B uses the handed pairing information to start a high-speed wireless communication with the image forming apparatus 10 and simultaneously notifies the image forming apparatus 10 that the own device is in the telephone-receiver mode and can start a telephone call.

(6) When the high-speed wireless communication with the mobile device 30B is started, the telephone-call-condition managing unit 11a of the image forming apparatus 10 changes the state of the own device to "Talking." Then, the telephone call between the image forming apparatus 10 and the mobile device 30B is resumed.

Thus, even when a user A uses a mobile device as the telephone receiver of the image forming apparatus, another user B can have a phone conversation without passing the mobile device used by the user A to the user B.

As a result, this eliminates the need for passing the mobile device of the user A to the user B, thus solving a security problem taking into consideration that the mobile device contains a lot of personal information.

The above description has been given of the process for switching the mobile device as a telephone receiver during a telephone call using the process for switching the high-speed wireless communication.

Remote Switching

In the above-described description, only the telephone call in the mobile device in the telephone-receiver mode has been described. However, when the telephone partner sends a facsimile, the mobile device in the telephone-receiver mode may perform a remote reception (remote switching) by a specific operation with the mobile device in the telephone-receiver mode so as to switch the facsimile communication unit 19 of the image forming apparatus 10 to a facsimile reception mode.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A communication device for performing near-field wireless communication with an electronic device, comprising:
   a display circuit;
   a near-field wireless communication circuit that performs the near-field wireless communication;
   a high-speed wireless communication circuit that performs a high-speed wireless communication, the high-speed wireless communication achieving a communication speed higher than a communication speed of the near-field wireless communication, the high-speed wireless communication requiring setting information for causing a communicable condition between the communication device and the electronic device for starting the communication; and a control circuit that:
  receives information related to a state of the electronic device using the near-field wireless communication when the communication device comes close to the electronic device; and
  displays the received information related to the state on the display circuit and causes the communication device to transition to a mode corresponding to the information related to the state,
wherein the control circuit:
  receives the setting information from the electronic device using the near-field wireless communication; and
  causes the communication device to transition to a mode corresponding to the information related to the state and then starts the high-speed wireless communication with the electronic device using the received setting information.

2. A communication device for performing near-field wireless communication with an electronic device, comprising:
a display circuit;
a near-field wireless communication circuit that performs the near-field wireless communication; and
a control circuit that:
  receives information related to a state of the electronic device using the near-field wireless communication when the communication device comes close to the electronic device; and
  displays the received information related to the state on the display circuit and causes the communication device to transition to a mode corresponding to the information related to the state,
wherein the near-field wireless communication circuit further performs the near-field wireless communication with another communication device other than the communication device,
the communication device further includes a high-speed wireless communication circuit that performs a high-speed wireless communication, the high-speed wireless communication achieving a communication speed higher than a communication speed of the near-field wireless communication, the high-speed wireless communication requiring setting information for causing a communicable condition between the communication device and the electronic device for starting the communication, and
the control circuit:
  receives the setting information from the electronic device using the near-field wireless communication via the near-field wireless communication circuit and starts the high-speed wireless communication with the electronic device via the high-speed wireless communication circuit using the received setting information; and
  subsequently, transmits the setting information to the other communication device using the near-field wireless communication via the near-field wireless communication circuit when the communication device comes close to the other communication device.

3. A near-field communication system, comprising
a communication device,
another communication device other than the communication device, and
an electronic device,
wherein the communication device includes:
  a display circuit;
  a first near-field wireless communication circuit that performs near-field wireless communication; and
  a first control circuit that:
    receives information related to a state of the electronic device using the near-field wireless communication when the communication device comes close to the electronic device; and
    displays the received information related to the state on the display circuit and causes the communication device to transition to a mode corresponding to the information related to the state,
the electronic device includes:
  a second near-field wireless communication circuit that performs the near-field wireless communication;
  a second control circuit that transmits information related to a state of the electronic device using the near-field wireless communication when the communication device comes close to the electronic device;
  a telephone communication circuit that causes a voice call with an external circuit of the near-field communication system via a telephone line,
the communication device and the other communication device each further include an audio input/output circuit that receives and outputs audio to make the voice call via the telephone communication circuit when connected to the electronic device using the high-speed wireless communication, and
when the control circuit of the electronic device starts the high-speed wireless communication with the other communication device during a voice call by the high-speed wireless communication with the communication device and the audio input/output circuit of the communication device, the control circuit of the electronic device switches a destination of the high-speed wireless communication for the voice call from the communication device to the other communication device in response to an instruction.

4. A computer-readable non-transitory recording medium on which is recorded a control program for controlling a communication device for performing near-field wireless communication with an electronic device, the control program causing the communication device to function as a control circuit that:
  receives information related to a state of the electronic device using the near-field wireless communication when the communication device comes close to the electronic device;
  displays the received information related to the state on a display circuit and causes the communication device to transition to a mode corresponding to the information related to the state;
  performs the near-field wireless communication with another communication device other than the communication device,
  controls a high-speed wireless communication, the high-speed wireless communication achieving a communication speed higher than a communication speed of the near-field wireless communication, the high-speed wireless communication requiring setting information for causing a communicable condition between the communication device and the electronic device for starting the communication;
  receives the setting information from the electronic device using the near-field wireless communication and starts the high-speed wireless communication with the electronic device using the received setting information; and subsequently, transmits the setting information to the other communication device using the near-field wireless communication when the communication device comes close to the other communication device.

\* \* \* \* \*